(12) United States Patent
Robinson et al.

(10) Patent No.: US 9,261,598 B1
(45) Date of Patent: Feb. 16, 2016

(54) SYSTEMS AND METHODS FOR INTERMENT OF CREMATION REMAINS

(71) Applicants: Dana Bennet Robinson, La Jolla, CA (US); Tristan Alexander Robinson, Portland, OR (US)

(72) Inventors: Dana Bennet Robinson, La Jolla, CA (US); Tristan Alexander Robinson, Portland, OR (US)

( * ) Notice: Subject to any disclaimer, the term of this patent is extended or adjusted under 35 U.S.C. 154(b) by 0 days.

(21) Appl. No.: 14/662,997

(22) Filed: Mar. 19, 2015

(51) Int. Cl.
*G01S 19/14* (2010.01)
*A61G 99/00* (2006.01)

(52) U.S. Cl.
CPC .................. *G01S 19/14* (2013.01); *A61G 99/00* (2013.01)

(58) Field of Classification Search
CPC ................................ G01S 13/878; G01S 19/14
USPC .......... 342/357.2, 357.25, 357.52; 27/1, 22.1, 27/29; 53/527
See application file for complete search history.

(56) References Cited

U.S. PATENT DOCUMENTS

| | | | |
|---|---|---|---|
| 6,055,793 A * | 5/2000 | Irwin | A61G 17/08 27/1 |
| 2004/0098846 A1* | 5/2004 | Glass | E04H 13/008 27/1 |

* cited by examiner

*Primary Examiner* — Dao Phan
(74) *Attorney, Agent, or Firm* — Baumgartner Patent Law; Marc Baumgartner (57) ABSTRACT

Systems and methods for managing a plurality of interred cremation remains are disclosed. The systems and methods relate to a parcel of land and a computer database. The parcel of land includes first and second geolocated plots, wherein the first geolocated plot includes the cremated remains of a first deceased subject, and the second geolocated plot includes the cremated remains of a second deceased subject. The computer database electronically stores the geographic positions and the occupancy status of the first and second plots.

18 Claims, 10 Drawing Sheets

Standard Locator

*FIG. 8C*

Augmented Reality

SYSTEMS AND METHODS FOR INTERMENT OF CREMATION REMAINS

BACKGROUND

The present disclosure relates generally to the interment of human or animal remains. In particular, systems and methods for interring cremated remains including a geolocated plot on a parcel of land and a database for storing location and status of the plot are described.

Today, cemeteries and mortuaries are typically complex enterprises that combine a variety of physical assets. Cemeteries require large tracts of land and specialized improvements that are prepared for occupancy in advance of need. They generally require investment in specific inventory which may take decades to market and absorb.

With traditional burial methods, a dead body is placed in a casket and the casket is buried in the ground of a cemetery. An entire industry revolves around traditional interment, including mortuaries where bodies are preserved and displayed for memorial services, where coffins are sold, and where cemetery plots are sold. A conventional cemetery is typically a unique piece of real estate where remains are interred, generally in perpetuity. A grave stone is usually purchased to place as a marker where the remains are buried. A fee is typically charged for the service and maintenance of the burial plot.

A cemetery, however, is not a typical real estate investment. The land is dedicated to the purpose of interment forever, laws regulate the cemetery business, trusts and endowments are used to pay for the maintenance of the cemetery. A land owner would be remiss to think that a cemetery would be a highest and best use of a plot of real estate in virtually any state in the United States. Some state laws even prohibit profiting on cemetery land.

Until fairly recently, most modern Western consumers have viewed the burial of a body in a cemetery, typically within a coffin, as the most proper means of interment. However, as consumer beliefs have changed, and cremation has become more and more acceptable. Cremation is the process of reducing human or animal remains to ashes. In this state, there is no prohibition against the possession and disposition of the cremated remains, or "cremains."

Cremains have often been held in a sealed "urn" which is kept by family members of the deceased, or by the owner of a pet that has been cremated. In other cases, ashes are scattered at sea, or taken by a family and scattered in a place desired by the deceased or the family. Some parks are considered "scattering ground" where it is acceptable to simply scatter all or part of cremains, which then become part of the soil and are neutrally integrated into the surroundings. In still other cases, cremains are put into a columbarium, or a permanent memorial device at a cemetery or other location. Columbaria are often walls where cremains are deposited and a small plaque placed on the wall of "drawers" or other storage units. The columbarium is more efficient in that it allows the remains of many more deceased to be placed in a smaller space, and can be built tall or even subterranean.

Once the cremated remains are possessed by the deceased's loved ones, the remains may be disposed of in virtually any way. Usually, a family is faced with only a few options: keep the cremains; permanently inter the cremains and incur the costs of perpetual interment; or dispose of the cremains. Many families do not desire to keep cremains, yet they do not wish to incur the cost of permanent interment. Others are uncomfortable with the ethereal nature of scattering at sea or in a forest.

It is desirable therefore to provide something less ephemeral than the scattering of ashes in the ocean or on the ground, and yet less permanent than the use of a grave or columbarium. Furthermore, it is desirable to provide a sophisticated yet simple and elegant solution that gives "place" to the interment of cremains, yet does so in a way that is free of the burden of cemetery laws, and perpetual maintenance.

SUMMARY

The interment systems and methods described herein provide solutions to many of these issues. As disclosed herein, systems and methods for managing interred cremation remains are described.

In some embodiments, an interment system includes a parcel of land and a computer database. The parcel of land includes first and second geolocated plots. The first geolocated plot includes a first interment of cremated remains of a first deceased subject, and the second geolocated plot includes a second interment of cremated remains of a second deceased subject. The computer database electronically stores the geographic positions and the occupancy status of said first and second plots.

In other embodiments, the inventive subject matter contemplates methods of interring the cremated remains of deceased subjects within a parcel of land, including (a) designating a first plot within the parcel to contain a first interment of cremated remains of a first deceased subject, and designating a second plot to contain a second interment of cremated remains of a second deceased subject; (b) interring the first cremated remains of the first deceased subject within the first designated plot, and interring the second cremated remains of the second deceased subject within the second designated plot; (c) geolocating said designated first and second plots; and (d) storing said geolocation and the occupancy status of the first and second plots electronically in a computer database.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The disclosed systems and methods will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Representative embodiments according to the inventive subject matter are shown in FIGS. 1-13, wherein the same or generally similar features share common reference numerals.

As used herein, the term "cremains" refers to cremated remains of a human or an animal. A "plot" refers to a space dedicated to the interment of one or more cremains, usually the cremains of a single person or animal. A "parcel" refers to an area of land used for interment. A parcel may contain multiple plots. A "hole" refers to a hollow place in the ground and may include a cavity, a chamber, and the like to hold the cremains.

The inventive subject matter is directed to systems for managing a plurality of interred cremation remains and includes a parcel of land and a computer database. In one embodiment, the parcel of land includes a plurality of plots of land, each of these plots being geolocatable. A first geolocated plot includes a first interment of cremated remains of a first deceased subject, and a second geolocated plot includes a second interment of cremated remains of a second deceased subject. The computer database electronically stores the geographic positions and the occupancy status of the first and second plots.

The inventive subject matter is also directed to methods of interring the cremated remains of deceased subjects within a parcel of land, including (a) designating a first plot within the parcel to contain a first interment of cremated remains of a first deceased subject, and designating a second plot to contain a second interment of cremated remains of a second deceased subject; (b) interring the first cremated remains of the first deceased subject within the first designated plot, and interring the second cremated remains of the second deceased subject within the second designated plot; (c) geolocating said designated first and second plots; and (d) storing said geolocation and the occupancy status of the first and second plots electronically in a computer database.

Treatment of Remains

Figure 1:
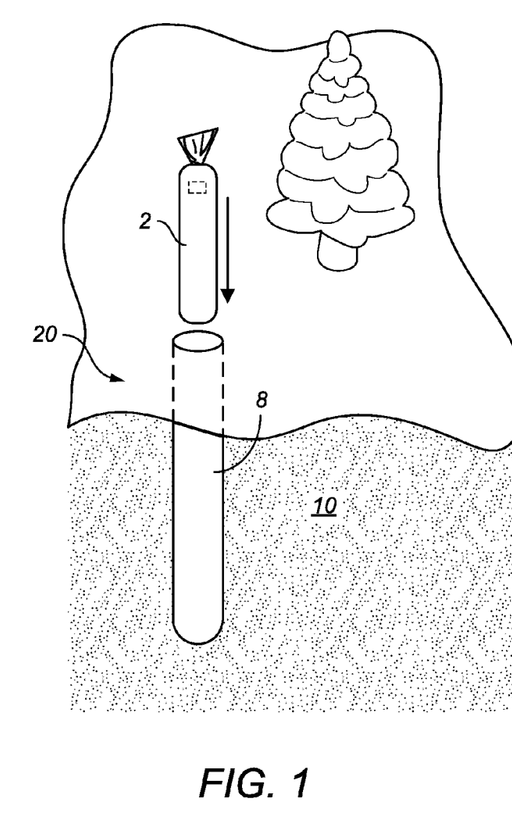
FIG. 1 is a simplified cross-sectional perspective view of a parcel of land with a geolocated plot and an interment of cremated remains of a deceased subject.

In some embodiments, an administrator accepts the ashes from a crematorium service. The crematorium might put the cremains into the container or they might arrive at the burial location in the conventional "plastic bag within a box." Those ashes can be placed in a special container that is just the right size for a predetermined plot, for example having a particular bore diameter. FIG. 1 illustrates a burial site 20 with cremains 2 to be inserted into a hole 8 in the ground 10. Hole 8 may have a suitable complementary shape to receive cremains 2.

Figure 2:
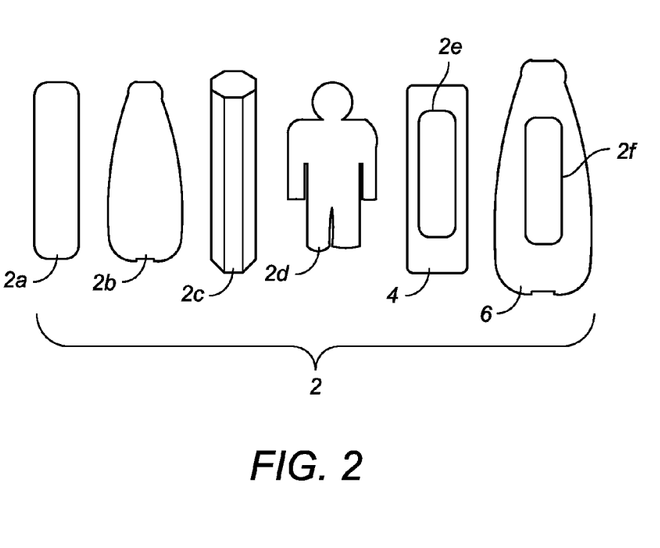
FIG. 2 is a simplified front view of examples of different cremains formed into different shapes or held in raw ash form inside another container.

In other embodiments, the ashes themselves are combined with a liquid and treated under pressure to be formed into a standard "capsule" or "urn" shape or perhaps formed into a statuette in a fanciful form. As illustrated in FIG. 2, cremains 2 may be formed into many different shapes. For example three-dimensional shapes 2a, 2b, 2c and 2d may be formed using techniques such as pressurizing the cremains or the addition of adhesive materials to the cremains to mold them into a specific shape.

Optionally, special objects or materials may be included with the cremains. In the "ashes in capsule" approach this may include physical items or materials comingled with the cremains or it might take the form of a special compartment in the capsule where items may be stored, separate from the ashes but held in the same overall container, or any other suitable form.

In some embodiments, a radio frequency identification (RFID) device is added to the cremains. The cremains and a RFID device can be contained in a waterproof container interred within the geolocated plot. This could be as simple as a plastic bag, or as complex as a mini-coffin that is made of biodegradable materials. It can also be a means of forming the cremated remains into a semi-hard mass that can be transported and deposited in the ground without falling apart or blowing away as raw ash might. FIG. 2 shows ashen remains, for example cremains 2e and 2f, that are put into a waterproof container 4 or a biodegradable capsule such as a ceramic urn 6.

Preparation of the Plot

Figure 3:
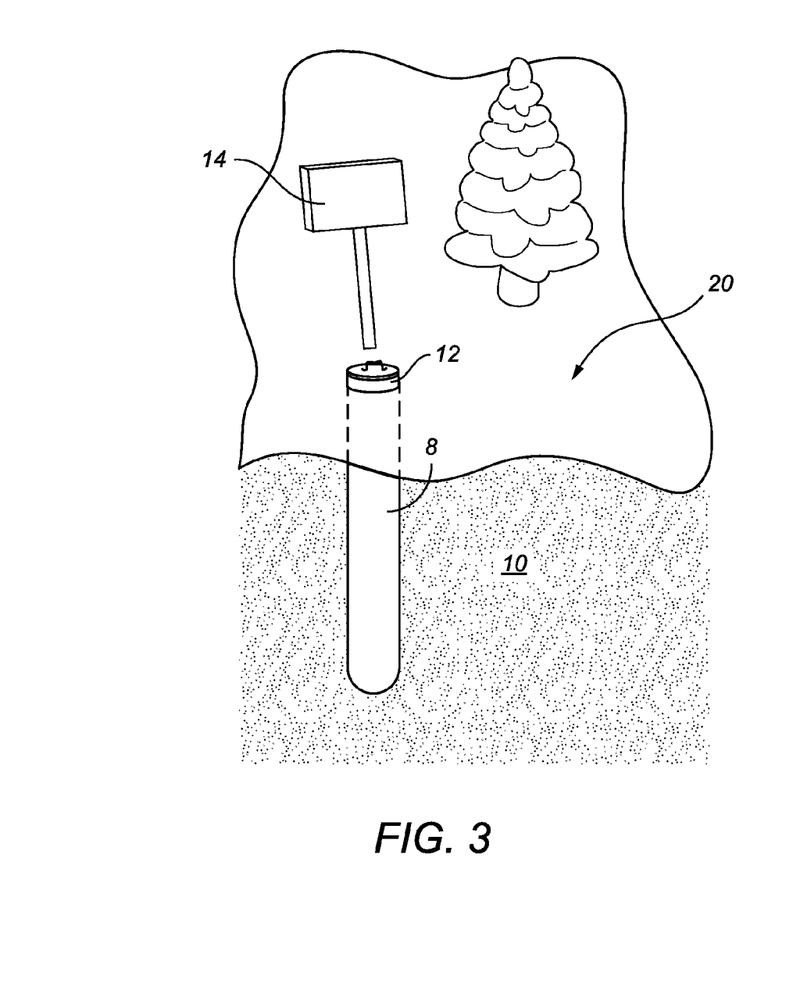
FIGS. 3 and 4 are simplified cross-sectional perspective views of a parcel of land showing details of accessories used in preparing a plot.

When a memorial is planned and cremains are being taken care of, the hole can be dug and left ready for the family and/or funeral planner to use on the day of the burial and optionally a memorial service. In preparation of a burial site 20 for burial of cremains several accessories may be used. For example, FIG. 3 shows a temporary cap 12 that may be used to cover hole 8 to prevent the hole from filling up with soil or water. A cap also keeps a plot safe from tampering by passer-by and prevents people and animals from accidentally entering the hole. The cap is also something that is easy to remove at the time of burial.

Figure 4:
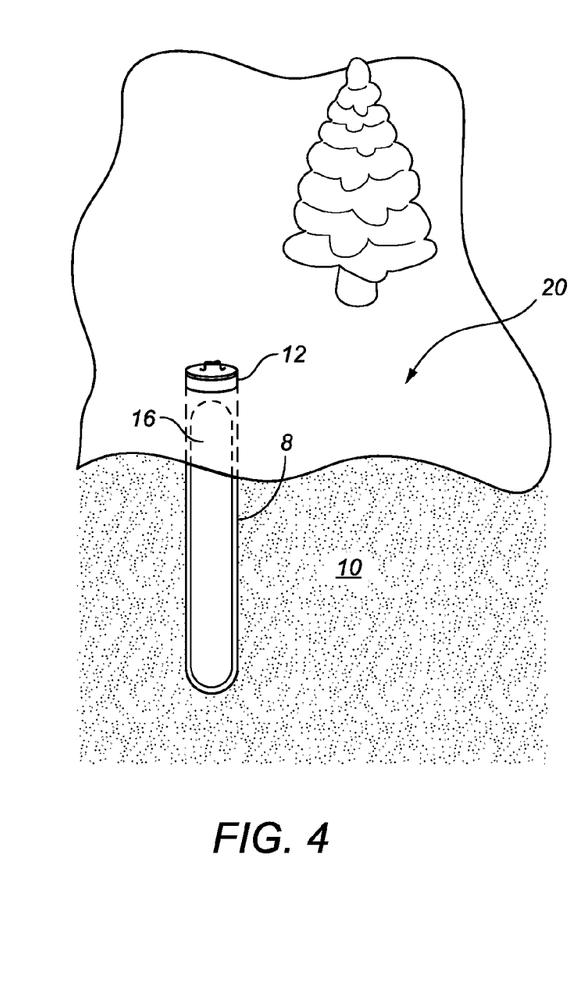

In addition to cap 12, an inflatable bladder 16, shown in FIG. 4, or other insert may be used to keep soil, water, or mud from falling into hole 8 between when the hole is dug and when the cremains are placed into it. A temporary sign 14, for example displaying "Smith Memorial Service," may be staked near burial site 20.

Locating the Burial Plot

Once a parcel of a piece of land has been designated as a burial site, it can be divided up into individual permanent plots. For example, each plot could be approximately two feet square. Assignment of specific lots avoid crossover or digging into an existing plot. The term "permanent" refers to the duration of the period designated for the burial site in the property owner's contract. This could be a truly permanent period indicating that nothing will ever be built on this parcel. But it could also be a permanently located plot during the period of the contract, sometimes 15 years or sometimes 50 years depending on the property.

In some embodiments, plots may be assigned based on the Global Positioning System (GPS) locations. Once the plots have been identified, a prospective buyer may see the plots on a map. For example, on a website where someone could see the plot and make a purchase, or the consumer could visit the actual site and use a device to locate different available plots using GPS.

Figure 5:
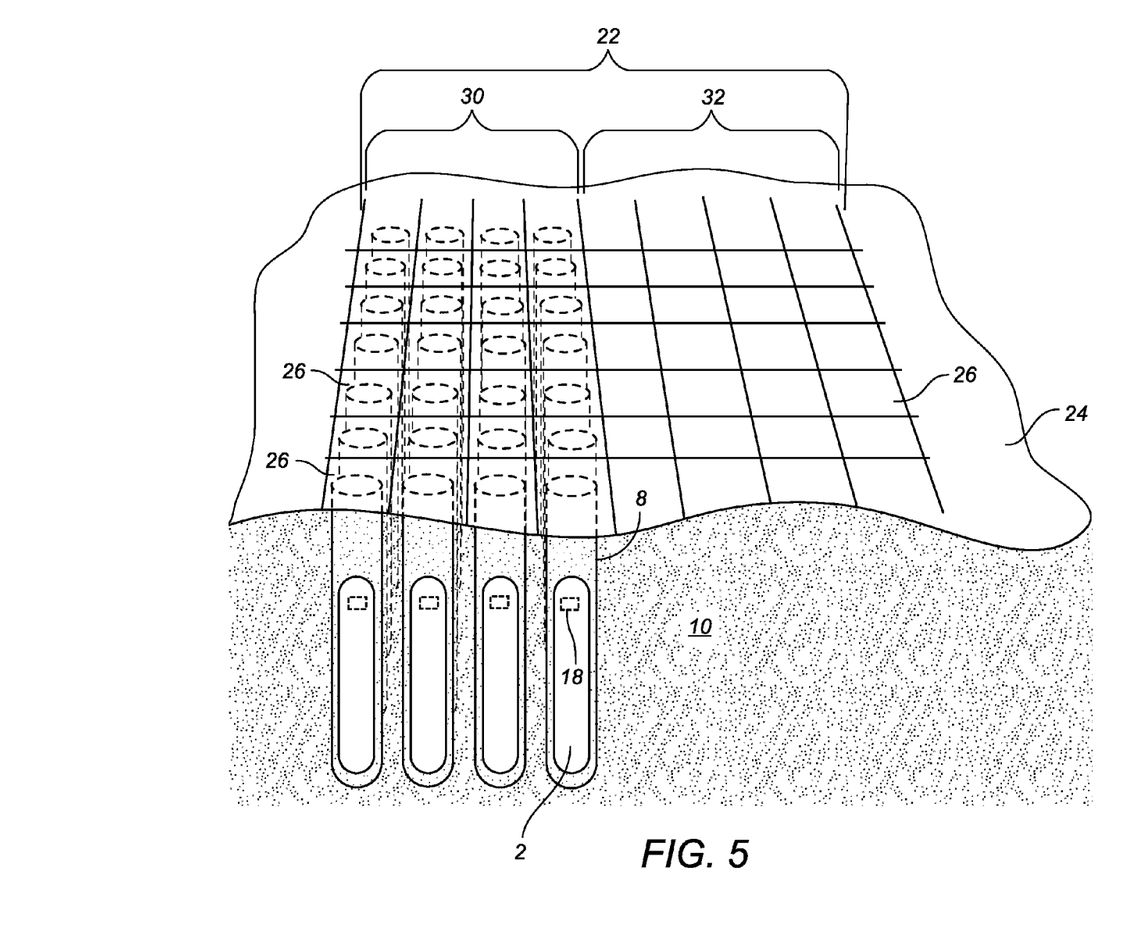
FIG. 5 is a simplified cross-sectional perspective view of a layout of a parcel of land with individual plots according to the inventive subject matter.

FIG. 5 shows a piece of land 24 with a parcel 22 including a plurality of individual plots 26. Parcel 22 has a plurality of used or occupied plots 30 and a plurality of unused or vacant plots 32. In this embodiment, each plot 26 of used plots 30 is geolocated and contains a radio frequency identification (RFID) device 18, for example embedded with cremains 2. Vacant plots 32 are individually identified for future interment of cremated remains of deceased subjects, and the occupancy status of each vacant plot is electronically stored on a central computer database. For example, unused plots 32 can include an individual plot 26 that is ready for use and identified by geolocation.

A gravedigger can use a similar process when identifying the hole to be dug when the "owner" has died and is ready to be buried. When the cremains are buried in a plot, an identification device such as a radio frequency identification (RFID) device 18 with a unique predetermined identification code can be placed in hole 8 with the cremains 2. At a later time, RFID device 18 may be used in place of or in conjunction with GPS for locating plot 26.

A final phase of plot locating occurs each time that friends of family of the deceased come to visit the plot. They may find the plot by visiting a website and getting a general "feel" from the map as to where the plot is located. They may also use a communication device such as a mobile or handheld device which would leverage GPS and/or RFID to "zero" in on the plot location.

Figure 6:
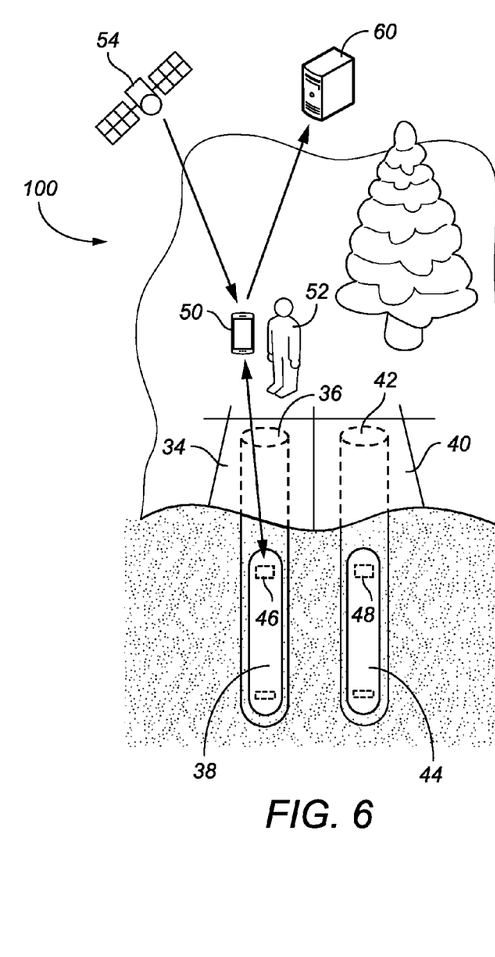
FIG. 6 is a simplified cross-sectional perspective view of a plot according to the inventive subject matter and illustrating a geolocation verification and location process of the plot.

FIG. 6 shows elements of a system 100 for managing a plurality of interred cremation remains. System 100 includes a parcel of land with first and second geolocated plots 34, 40. First geolocated plot 34 holds a first interment 36 of cremated remains 38 of a first deceased subject. Second geolocated plot 40 holds a second interment 42 of cremated remains 44 of a second deceased subject. System 100 further includes a computer database 60 which electronically stores the geographic positions and the occupancy status of first and second plots 34, 40.

Each plot 34, 40 is identified for burial of cremains by a burial site administrator of land owner. Identification may be done, for example by using GPS or geolocation. In some embodiments, an RFID device with a unique predetermined code is placed in each occupied plot in order to locate the plot. For example, a first RFID device 46 with a unique predetermined first RFID is placed in first plot 34, and a second RFID device 48 having unique predetermined second RFID, different from the first RFID, is located in second plot 40.

Information about the deceased and the plot may be stored in a computer database or server and a user may send or received such information over a network. Access to the stored information may be restricted to a group. For example, computer database 60 electronically stores information regarding first and second deceased subjects. Information regarding the first deceased subject interred within the first plot and the geographic position of the first plot is accessible to a first population of people, and the information is identifying information regarding the second deceased subject interred within the second plot and the geographic position of the second plot is accessible to a second population of people different from the first population of people.

In some embodiments, information regarding the first and second deceased subjects includes communications provided by the first and second deceased subjects prior to their death, and wherein the communications can be made available to a population of people after the subject's death.

Computer database 60 is configured to be accessed through a client communication device, such as mobile electronic device 50, which can be a GPS enabled device allowing a first mobile electronic device user to geolocate the first geolocated plot and a second mobile electronic device user to geolocate the second geolocated plot. To assist with locating a plot, a controlling party or administrator of computer database 60 can provide to first and second parcel owners a selection of items including software to store the geolocation and the occupancy status of the first and second plots, access to the computer database to store geolocation and occupancy status of the first and second plots, means for geolocating first and second designated plots, and means for interring cremated remains as desired by a client.

Geolocating a plot of interest may be done with several purposes. For example, locating the plot for the purpose of selecting or selling the plot (this is achieved using geolocation but the consumer might make a plot selection on a map or on the website), locating for purpose of preparing plot for burial of cremains (for example a plot digger must find the correct plot location before digging hole and preparing for the day of burial), using mobile application or phone or by using a special-purpose device provided by the administrator, and locating by family of the deceased for the purpose of burial or later visitation.

Mobile device 50 has a mobile application which verifies the location of a visitor 52 that is using mobile device 50. In some embodiments, verification of the location of cremains can be accomplished via a space-based navigation system, such as via a satellite 54, and a GPS location that is recorded for the plot of the deceased. Additionally or alternatively, location of cremains may be accomplished by interaction between a handheld communication device, for example a mobile application on mobile device 50 and a buried RFID device 18.

Figure 8A:
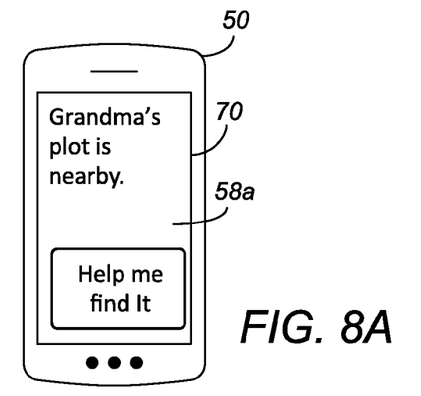
FIGS. 8A-D show several schematic top views of a communication device illustrating steps for locating a plot and using an application on a mobile device.
Figure 8B:
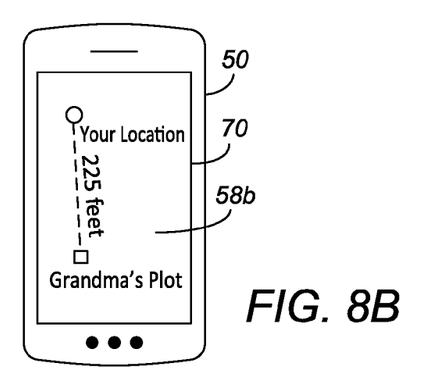
Figure 8C:
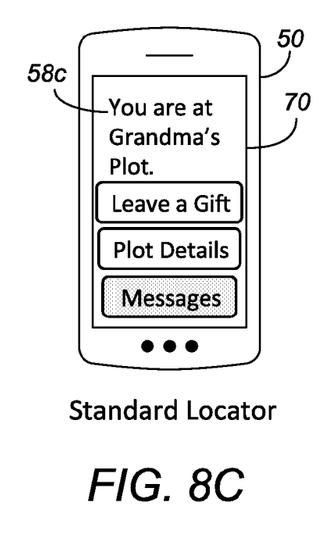
Figure 8D:
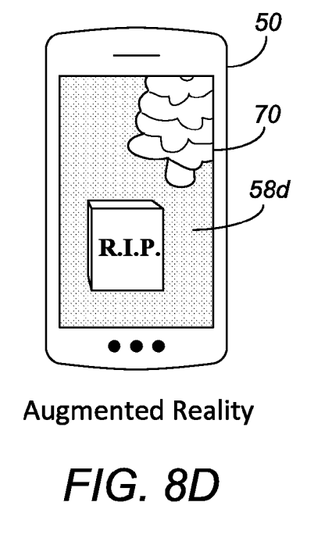

FIGS. 8A-D show a sequence of possible displays 58a-d on a user interface 70 of a mobile device 50, as they appear when a visitor is locating a plot. In this embodiment, the visitor has already been or authorized or registered with the administrator so that the plot to be visited is associated with the visitor. When approaching the site, the mobile application can be activated and the mobile application will be aware that the plot is nearby. As shown in FIG. 8A, mobile device 50 can show a display screen 58a including a query such as "Help me find it" eliciting execution of the mobile application. If the user opens the mobile application, they will see that there is a plot nearby which is associated with them, for example as shown on display screen 58b. The user can enlist the help of the device 50 to find the plot more specifically. The application on mobile device 50 can indicate distance to the plot and show a map including the location of the plot and the location of the visitor, as shown in FIG. 8B.

As the user approaches the plot, mobile device 50 shows more detailed information of the physical location of the plot. If the plot includes an RFID tag, then the GPS location may be used to bring the user into close proximity of the plot and the RFID will be used to verify that location and fine-tune the user so the location may be found with more precision. When the visitor is at the plot location, a screen, such as display screen 58c in FIG. 8C, can appear. The screen can include a selection of additional action items such as "Leave a Gift," "Plot Details," "Messages," and the like. If the deceased chose an augmented reality plot, the visitor may switch to a "live" view which will show the plot, for example a live camera view, and any virtual items associated with it, such as shown on display screen 58*d* in FIG. 8D.

Figure 7:
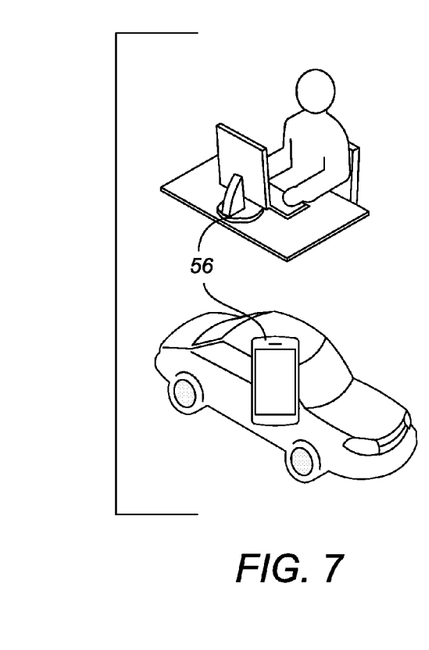
FIG. 7 is a schematic view illustrating options for remote access to unlocked information.

In some embodiments, a mobile application records a valid "visit" of the burial site. A server may check for any newly available content based on preset parameters, for example current date, number of visits, current location, date of previous visits, or visits by other users, and unlock new information as appropriate. Once a visitor is away from the site, unlocked information may be accessible from a mobile device 50 or other computers 56, including mobile applications, as shown in FIG. 7. In some cases, the deceased may have chosen to make certain content available only on-site, and not available off-site.

Figure 11:
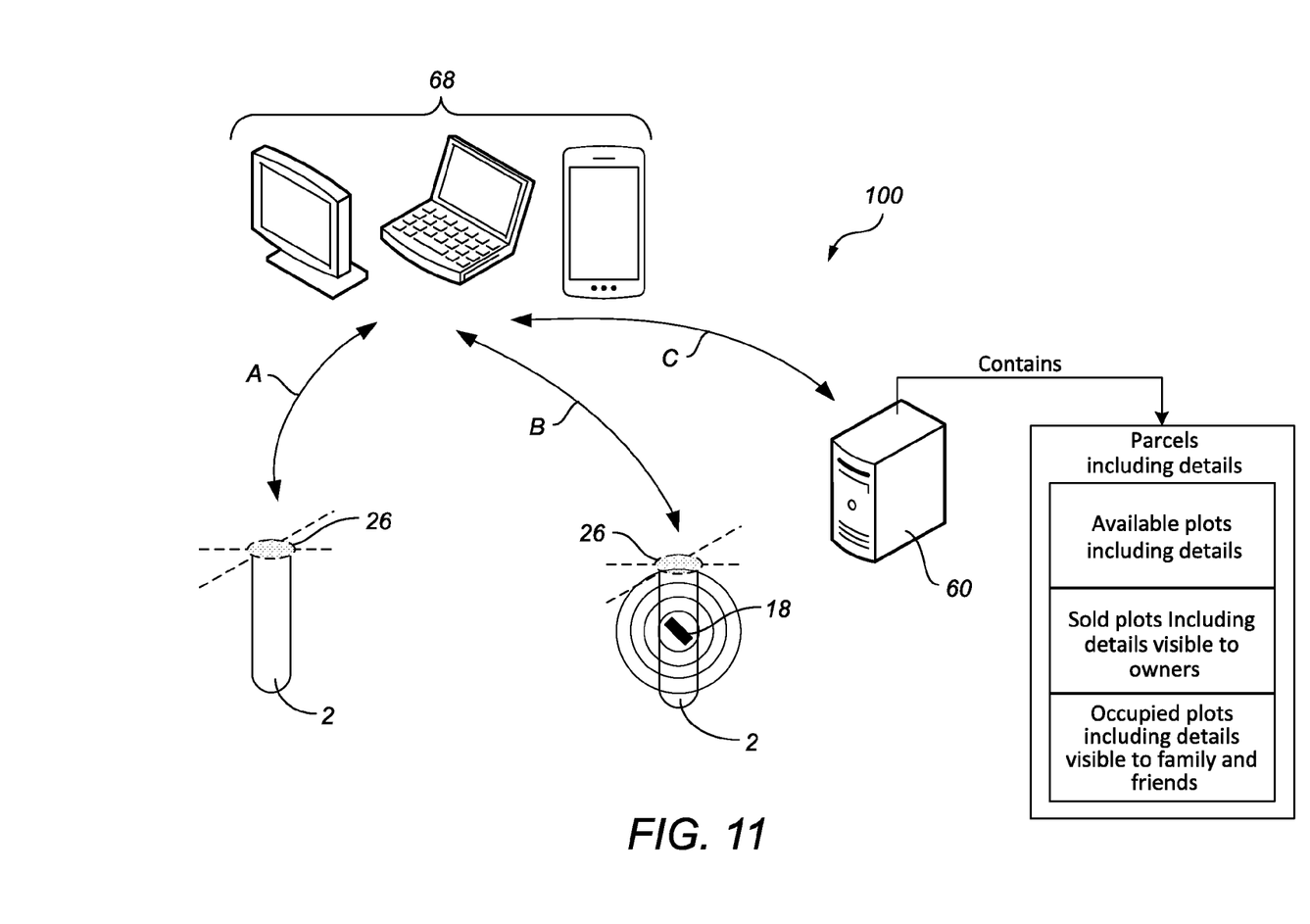
FIG. 11 is schematic illustrating different devices, systems, and methods as used with the inventive subject matter.

Examples of elements of a system for interment of cremation remains are shown in FIG. 11. A client communication device 68 can be used for transmitting and receiving location data over a network or via other communication channels. For example, a client communication device can be a mobile device such as a PDA, laptop, smartphone, tablet, netbook, and/or other mobile computing device, or a stationary device such as a desktop computer.

A dedicated application on the communication device may use a variety of different types of embedded or dedicated systems in which positioning subsystems are used. Generally, the client communication device has a processor to receive location data identifying the plot. For example, plot 26 may be identified via GPS location data provided to client communication device 68 via an appropriate communication channel, as illustrated with double-sided arrow A. In other embodiments, RFID device 18 provides location data to one or more of client communication devices 68, as illustrated with double-sided arrow B.

Where GPS is used for location, client communication device 68 receives a GPS signal and records a visit at or near the plot. Where a RFID tag is used, for example RFID device 18, the RFID tag emits a signal that is picked up by a communication device, for example via a RFID reader. The information can be communicated over the internet or other suitable communication means to the burial site administrator's computer database such as server 60. Double-sided arrow C illustrates communication between one or more of client communication devices 68 and administrator's server 60. Server 60 stores information related to the parcels, and includes information about the available plots, sold plots, and occupied plots.

Figure 12:
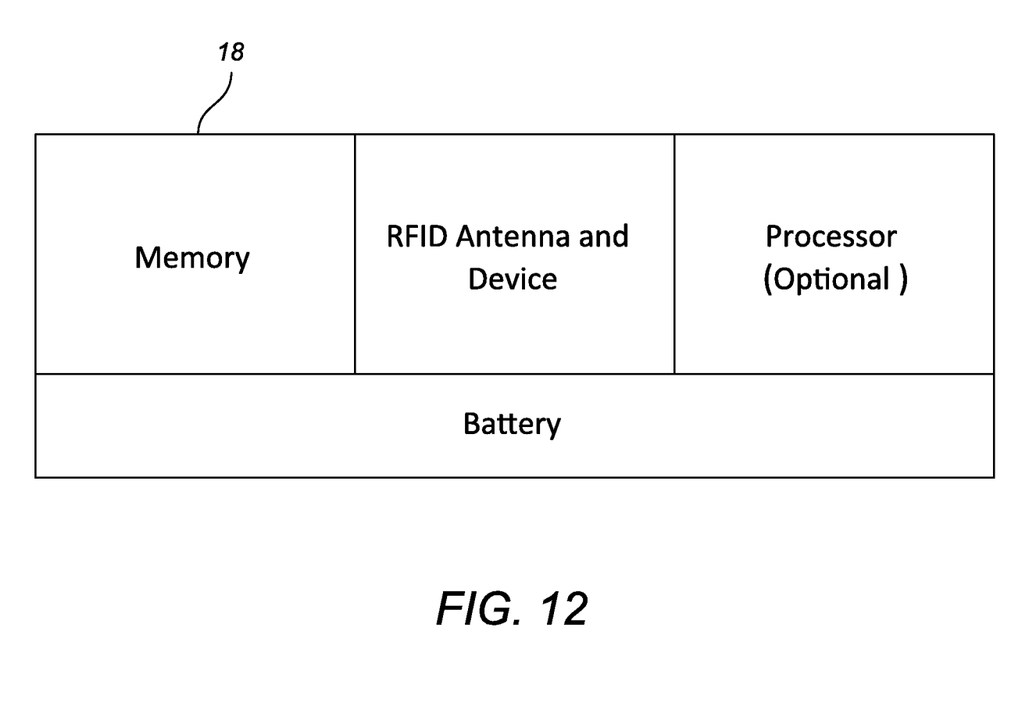
FIG. 12 is a schematic of architecture of a radio frequency identification device.

FIG. 12 shows an example of architecture of a suitable RFID device, such as RFID device 18, that can be buried with the cremains. Here, RFID device 18 consists of a memory for data storage, an RFID antenna to facilitate communication, and an optional processor. RFID device 18 further has a battery to transmit a signal to a reader antenna. The RFID device 18 can be configured to emit signals at predefined intervals or transmit only when addressed by a reader. It is understood that some embodiments may include passive RFID devices or other suitable locator devices as known in the art.

Communication with the Deceased

Some embodiments of the inventive subject matter include a type of communication that allows the loved ones of the deceased to continue to communicate with the deceased. This can be accomplished through normal communication channels such as email, SMS (text messaging), or a messaging function within the burial administrator website and/or mobile application. The acquaintance may send a message to their loved one. These messages can be stored, for example in computer servers and, depending on the preferences selected, may be visible to others, visible to the sender, or may be impermanent.

Optionally, a response message may be sent on behalf of the deceased. In cases where pre-need arrangements have been made, the deceased might have arranged written or recorded messages in response to messages. The logic for these responses might be very simple, for example "Thank you for your message." Or the logic may be very complex, for example "if Larry has not visited in more than one year then respond with X. If he has visited respond with a random selection from the following messages P, Q, R."

Additionally, if the consumer has chosen the option, a wireless memory device may be included with the ashes themselves at the time of burial. If someone visits the site in person, then certain messages from that user or from all users could be downloaded over wireless frequency to the memory device buried with the cremains. This can be a short-term window of communication, perhaps a few years depending on battery life of the memory device buried with the cremains, but this "direct" communication of private messages could be soothing to grieving family.

In addition to the possibility of this technological communication with the deceased, the deceased (in the case of a pre-need arrangement) may set up "locked" content that will only be available under certain conditions. For example, a certain video message from Grandma might only be available after five visits to the site of the plot. Or perhaps the locked message is available regardless of plot visitation, but only after 10 years have elapsed.

In some embodiments, technology can be used to allow the deceased to leave messages that play only upon certain events or dates. An example in one instance is that a deceased leaves a message for their children to appear only when they visit the plot. The RFID communicates with their mobile computer device, which interacts with servers to send stored messages to the user left by the deceased, for example a message such as "I love you. Do not be troubled" can be sent to the visitor.

In some cases, a computing device can be used within the plot to deploy messages in a similar way. The device can wirelessly transmit messages triggered by the arrival of a party with a mobile application that is able to read the wireless signals from the plot and provide messages to the user above ground. Software can be programmed with options by the deceased, possibly asking who the visitor is, and then once identified, providing a unique message to that user, for example a humorous decedent might say, "Well, I'm surprised to see you here!" It is understood that video, audio, and images can also be stored and played in the same way.

Virtual Grave with Optional Augmented Reality

Figure 9:
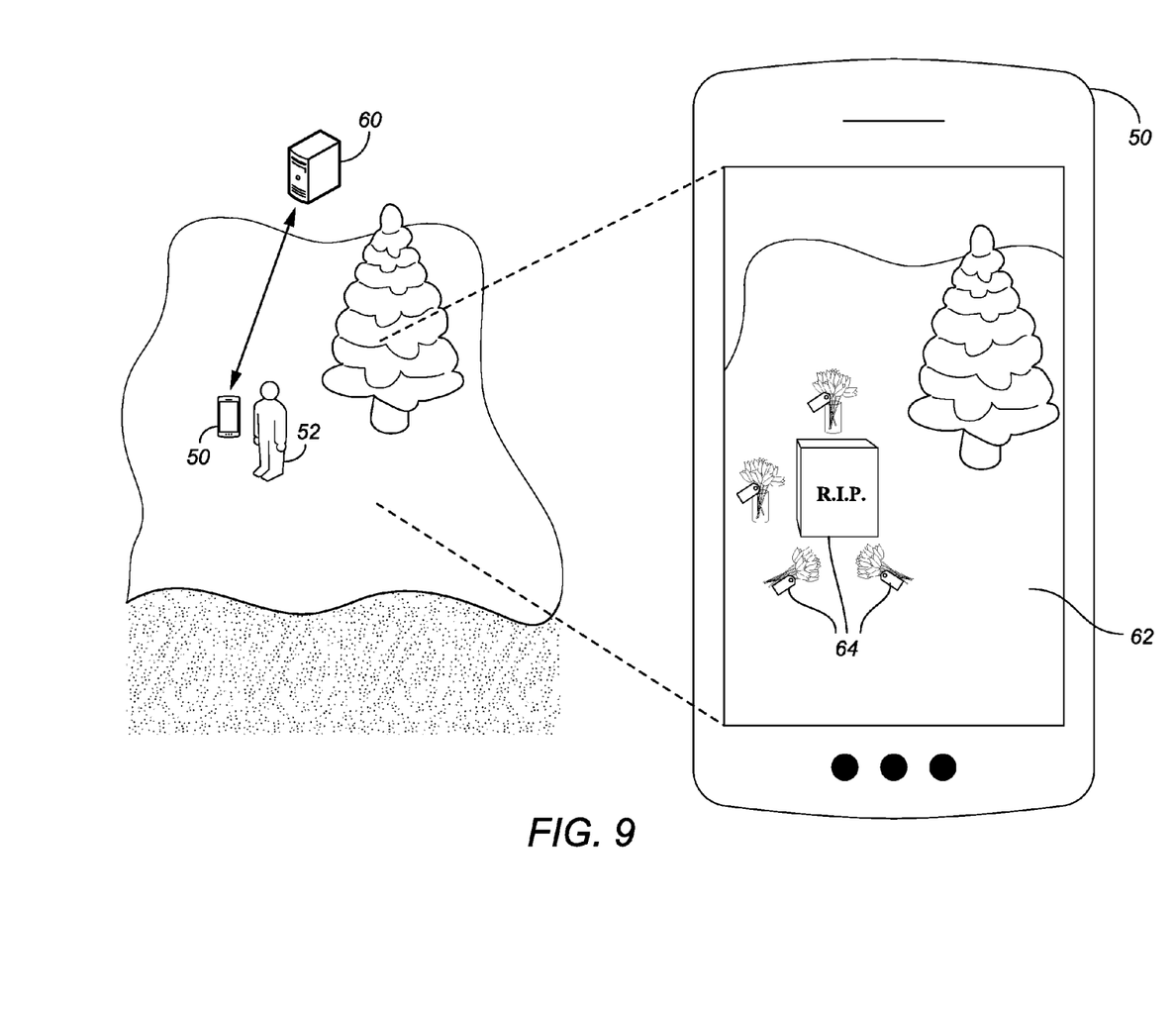
FIG. 9 is a simplified cross-sectional perspective view of a plot and an enlarged top view of a mobile device illustrating a virtual gravestone and accessories.

In some embodiments, the plot can be indistinguishable from the surroundings without technology to locate the plot. FIG. 9 shows a plot that is unmarked at the surface and indistinguishable from its surroundings. Through geolocation, a plot can be linked to data on a server 60 of the burial site administrator, or if an RFID tag is present the tag may activate a mobile application. Information about how the virtual plot should appear on mobile device 50 can be accessed either through connection to the server or was previously stored on the mobile device in the mobile application.

Mobile device 50 displays an augmented reality view 62, meaning that a visitor sees a "live" video of the real surroundings, for example through a camera in the mobile device. Additionally, other virtual items 64 may be seen such as a grave marker, gifts, and messages left by visitors of the deceased.

In some embodiments, a variety of virtual objects may be included in a displayed view of the plot site. Examples of virtual objects may include pictures of a gravestone or other marker, photos or other images, video imagery, gifts or donations left by visitors to the plot or by others via a visit to the website or to a specific application, mementos or markers left by visitors, and the like.

The virtual grave may include any manner of grave marker of any size. Photos or videos of the deceased could be included at or around the plot. This could all be visible through an "augmented reality" view on the mobile device or on a website. Records of people's visits could be left in the virtual three-dimensional space. Visitors can purchase items from the administrator's website or mobile application to leave at the grave. Subsequent visitors can see the items left by other visitors.

Figure 10:
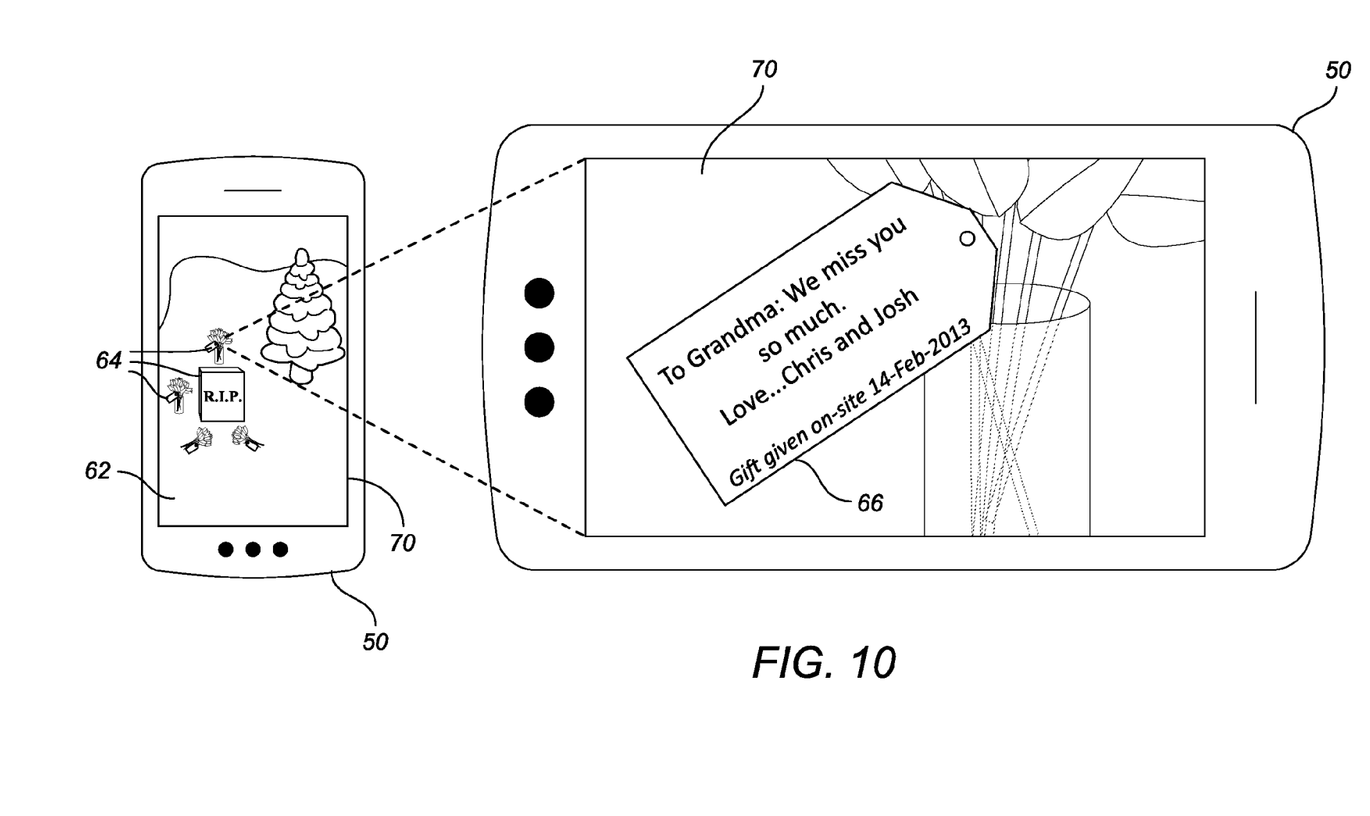
FIG. 10 is a simplified top view of a mobile device and an enlarged top view of a detail shown on the mobile device illustrating augmented reality for a virtual gravestone and accessories.

As illustrated in FIG. 10, a visitor may zoom into an item on augmented reality view 62 to see more details. For example, user interface 70 may display details of who left an item such as on a tag 66 with visitor information. Donations to non-profit or philanthropic causes in the memory of the deceased could also be left in the virtual space and could be done anonymously or with an attribution that could be seen by later visitors to the virtual grave (either through the mobile application "on site" or through the website).

In some embodiments, the augmented reality view, such as live video feed with digital artifacts placed on top of the "real" display, could also be used as a method to lead users to the exact location of the plot.

Figure 13:
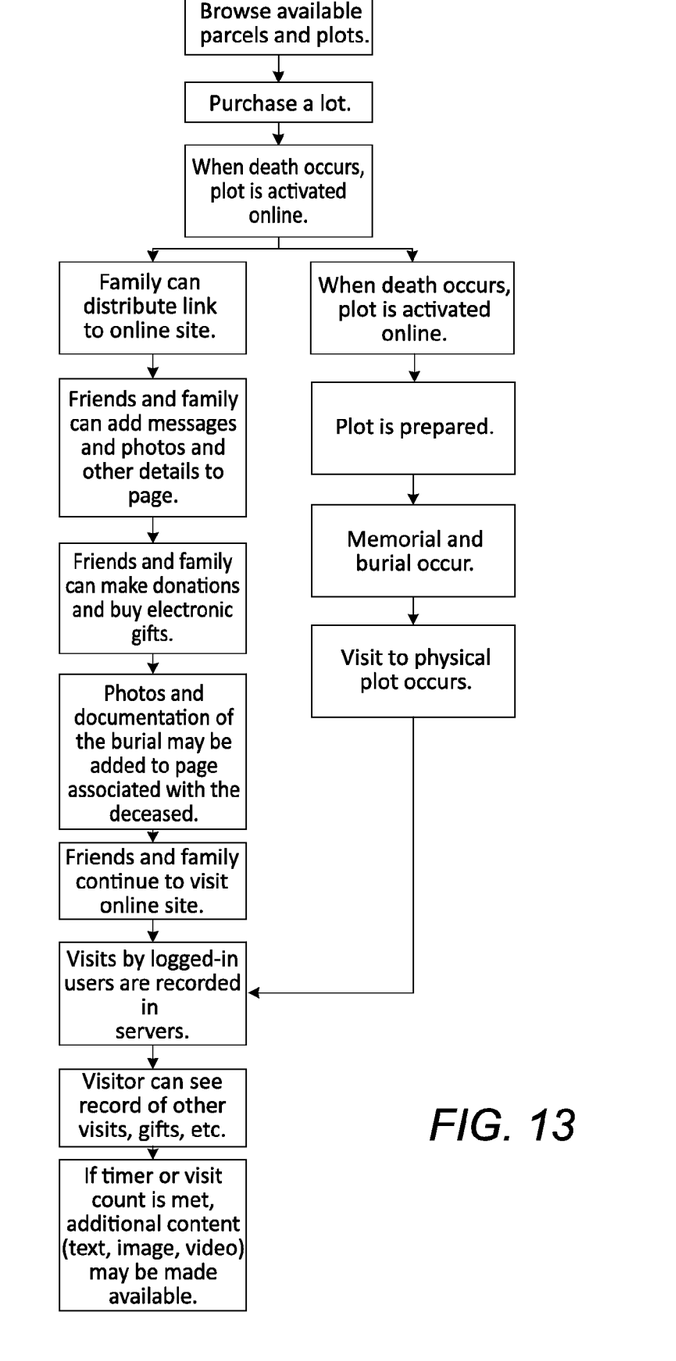
FIG. 13 is flow chart illustrating a typical timeline according to the disclosed methods.

FIG. 13 provides an overview of a sequence of steps associated with an example method of interring the cremated remains of deceased subjects within a parcel of land as described above.

The inventive subject matter offers several advantages over the traditional interment of cremains and expands the way in which traditional interment occurs in several ways. For example, the inventive subject matter allows families to use non-permanent interment as a means of having a dead body may be lain to rest in a few different ways. The inventive subject matter allows ceremony and formality similar to traditional burial style interment, yet without the cost associated therewith. The family can hold a graveside service, drop dirt in after the cremains are deposited, and know exactly where the cremains are located for many years. For tens of years, a generation or two of family members and loved ones can visit the location the same way a person might visit a grave at a cemetery and bring flowers, or deposit digital flowers at the location. Parties can find the location of the interment through a website, web application or mobile device using various location technologies such as GPS, and pinpoint the location using local technology such as RFID or other location technology to isolate the location.

The technology used to identify the location can also trigger interaction with the user through a mobile device, in this way, interacting with the location at the will of the deceased or the loved ones. A consumer who has arranged for his own interment can have pre-recorded messages, video, images, and data that is displayed upon triggering events, such as a date, special day, or upon the appearance of a specific loved one at the interment location. A message can be displayed to any party who merely goes to the location of the interment as well, in this way acting as a virtual gravestone. The virtual gravestone can be displayed in augmented reality. The use of augmented reality allows a user to use a mobile device with a camera or viewer to see the actual location that they are viewing in real time, together with augmentations, such as a sign, a grave stone, additional images overlaid on the real view, and messages. If a family member has placed digital flowers at the graveside, they can be displayed in augmented reality so that others can view the flowers left by others, and perhaps, click to see who and when the digital flowers were left, or "like" the flowers or otherwise post the digital message or flowers to social media or other websites.

In some embodiments, an administrative panel may give parties the power to control what can be done with the digital interaction with the location. For example, a consumer can set up the options prior to death and limit what can be done by others after death, or leave it to the loved ones to control the interactions. A consumer may wish to allow visitors to interact with the digital gravestone in a way that allows them to donate to a cause, or read poems.

In further embodiments, an operator or administrator of the digital environment can choose to sell digital products to the consumers who use the software, or to charge a fee to leave digital gifts and flowers, and even to donate a portion of such fees to a charity or other cause at the discretion of the decedent, the family or the operator. Thus, there is an opportunity for the operator to profit from the management of an ongoing system for managing the locations of the interred remains, and allows for the parties involved to also provide means for donations to causes or even revenue sharing with either or both of the decedent and family or the land owner.

The inventive subject matter may open new opportunities for landowners. For example, methods according to the inventive subject matter may create an unrealized value to land owners who can provide non-perpetual interment for cremains for a fee, without converting their real estate into a cemetery or other regulated business. In some embodiments, the inventive subject matter provides a significant new opportunity for land owners to take land with other uses or no use at all and allow that land owner to add a new line of revenue to the income on their real estate. For example, a land owner with open, undeveloped real estate can operate a non-cemetery, where they can permit the interment of cremains on a non-perpetual basis for a fee. Empty land can remain empty without grave stones or markers or other indicia of cemetery, and even have a park-like setting where grass or other landscape is used to make a beautiful setting, but the entire real estate is simply in a state desired by the real estate owner, and never becomes a cemetery in the sense of a perpetual location for remains.

A property owner can operate a profitable business in just interment without carrying the regulatory burden of a conventional cemetery. The property would generally not be considered a cemetery, as there would not be regulated remains or other operations that require perpetual maintenance. The land owner's obligation could be a product of legal contracting, and real estate encumbrances created by contracting parties. A land owner could sign an agreement to ensure that any location secured on his land would be encumbered on title for the designated period and no longer. Thus, in some embodiments, the inventive subject matter could be expressed on land that is operated by a property owner to offer non-perpetual placement of cremains for a fee or other consideration.

To illustrate, one acre of land might only hold a few hundred traditional burial plots. However, the same acre can provide 20,000 to 40,000 plots for use according to the inventive subject matter. Where a traditional cemetery might sell 3,000 plots for 15,000 each, and never again be able to use the land or resell it, providing a one-time gross revenue of $45,000,000, the same acre can be used with the inventive subject matter to sell 2×2 square feet plots for $3,000 for 20 years, making the landowner $60,000,000 for 20 years and after the end of the term, and leaving the landowner free to do the same again or simply put the property to a higher and better use at that time in the future.

There are presently no real long-term, non-perpetual options for interment. The consumer is torn between temporal scattering, costing for example about $500-1000 and perpetual options from $5,000 to $15,000 and up. For example, some scattering gardens charge about $1,000 to use a cemetery space where the cremains are scattered, and no permanent marker bears a memorial. Options such as urn gardens may charge about $500, and permanent niches average about $10,000.

In addition to the use of undeveloped land for cremation ground, the inventive subject matter envisions the use of existing land that is developed for additional purposes around cremation interment. For example, the owner of a beach front home may be able to add monetization to his land by allowing cremains to be interred on a non-permanent basis on his land.

Other example embodiments envision a city or municipality able to monetize land and parks by allowing the land to be used as non-perpetual cremains interment ground; or a city using the inventive subject matter to map locations, sell locations and provide a means of managing the burial process over a course of time. With municipal governments owning, controlling or managing vast inventories of land at the expense of tax payers, the inventive subject matter provides a means to add revenue to the government's base to be used to offset the maintenance and management of the real estate, or to add to general funds.

Parks are often used for memorials, weddings, or other ceremonies. An ocean front park might be used for a memorial, netting the city a small fee for a permit, followed by ashes being scattered in the ocean. The inventive subject matter also provides a means of allowing the city to generate revenue from the use of the same park as an interment location, for which it may charge a substantial fee in comparison to the permit fee.

Furthermore, private landowners in urban locations may be allowed to use their land for interment grounds as well. Whether commercial, residential, or other land, a land owner can provide a means to let residents use parts of the land to inter cremains for a fee. The inventive subject matter provides a means to facilitate this, ensuring orderly use of the land, precise locations of cremains, and software to manage the location, the use of the land, and even post burial visitation of the plot.

In some embodiments, churches can monetize their own parcels of land, allowing plots to be allocated for a fee or donation, without the historic problem of limitations due to perpetual graves. A church might allocate plots to be used for ten years or twenty, allowing the church to recirculate the plots, or change plans and later build on the same parcel once the term of the plots has expired.

The inventive subject matter also opens new opportunities for mortuaries. Mortuaries are service providers who are losing many additional services when a consumer simply uses them for a memorial service and then retains the cremains thereafter. The inventive subject matter provides an opportunity for the mortuary to sell its memorial services, facilitate cremation, and also offer a "plot side" memorial, hole digging and sale of related devices and systems for a fee. The mortuary can offer the software envisioned in the disclosed inventions as a tool for selling the service, and even upsell products, such as digital flowers, enhanced technology, and the like.

Another advantage of the inventive subject matter is that it can provide a business opportunity for people in the funeral services business without a need for state licensing or certification. Under this example, a business owner could provide a software application that allows clients interested in purchasing a plot for burying cremated remains to crowd source multiple land owners who are willing to make their land available for burying cremated remains. Thus a client could search and select a parcel and/or plot from a plurality of potential land owners based on available criteria, such as price, geographical proximity, landscape (seaside, mountaintop, grassy field). In further embodiments, for example, a wedding planning business operation can add memorial services and act as a franchise operator for the disclosed method and systems. Such business can coordinate the sale of the plot for a commission, charge fees to dig a hole on the appropriate date, facilitate the memorial service, and ensure the orderly completion of the process.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A system for managing a plurality of interred cremation remains comprising:
    a parcel of land comprising first and second geolocated plots, wherein the first geolocated plot comprises a first interment of cremated remains of a first deceased subject, and the second geolocated plot comprises a second interment of cremated remains of a second deceased subject; and
    a computer database that electronically stores geographic positions and occupancy status of said first and second plots.

2. The system of claim 1, wherein the first and second plots are geolocated by a Global Positing System (GPS).

3. The system of claim 2, wherein the first plot contains an interred first Radio-Frequency Identification (RFID) device having a unique predetermined first RFID and the second plot contains an interred second RFID device having unique predetermined second RFID, different from the first RFID.

4. The system of claim 1, wherein the first plot contains an interred first RFID device having a unique first RFID and the second plot contains an interred second RFID device having unique second RFID, different from the first RFID.

5. The system of claim 4, wherein the first interment of cremated remains and the first RFID device is within a first waterproof container interred within the first geolocated plot and the second interment of cremated remains and the second RFID device is within a second waterproof container interred within the second geolocated plot.

6. The system of claim 2, wherein the database is configured to be accessed through a GPS enabled mobile electronic device, such that a first mobile electronic device user can geolocate the first geolocated plot and a second mobile electronic device user can geolocate the second geolocated plot.

7. The system of claim 1, wherein the computer database electronically stores information regarding the first and second deceased subjects.

8. The system of claim 7, wherein the information is identifying information regarding the first deceased subject interred within the first plot and the geographic position of the first plot is accessible to a first population of people, and the information is identifying information regarding the second deceased subject interred within the second plot and the geographic position of the second plot is accessible to a second population of people different from the first population of people.

9. The system of claim 7, wherein the information regarding the first and second deceased subjects includes communications provided by the first and second deceased subjects prior to their death, and wherein said communications are made available to a population of people after the subject's death.

10. The system of claim 9, wherein the information regarding the first deceased subject interred within the first plot is configured to be displayed on an electronic device of a first population of people when a member of the first population is in geographic proximity to the first plot, and the information regarding the second deceased subject interred within the second plot is configured to be displayed on an electronic device of a second population of people, different from the first population of people, when a member of the second population is in geographic proximity to the second plot.

11. The system of claim 1, further comprising a plurality of vacant plots individually identified for future interment of cremated remains of deceased subjects, wherein the occupancy status of the vacant plots are electronically stored on the computer database.

12. A method of interring the cremated remains of deceased subjects within a parcel of land comprising:
   (a) designating a first plot within the parcel to contain a first interment of cremated remains of a first deceased subject, and designating a second plot to contain a second interment of cremated remains of a second deceased subject;
   (b) interring the first cremated remains of the first deceased subject within the first designated plot, and interring the second cremated remains of the second deceased subject within the second designated plot;
   (c) geolocating said designated first and second plots; and
   (d) storing said geolocation and the occupancy status of the first and second plots electronically in a computer database.

13. The method of claim 12, wherein the first and second plots are geolocated by Global Positing System (GPS).

14. The method of claim 12, wherein the first plot contains an interred first Radio-Frequency Identification (RFID) device having a unique predetermined first RFID and the second plot contains an interred second RFID device having a unique predetermined second RFID, different from the first RFID, wherein the RFID is used to locate the specific location of interred remains.

15. The method of claim 13, wherein the first plot contains an interred first RFID device having a unique first RFID and the second plot contains an interred second RFID device having unique second RFID, different from the first RFID, wherein the RFID is used to locate the specific location of interred remains.

16. The method of claim 13, wherein the database is configured to be accessed through a GPS enabled mobile electronic device, such that a first mobile electronic device user can geolocate the first geolocated plot and a second mobile electronic device user can geolocate the second geolocated plot.

17. The method of claim 12, wherein a controlling party provides to first and second parcel owners a selection from the group consisting of: software to store said geolocation and the occupancy status of the first and second plots, access to the computer database to store said geolocation and the occupancy status of the first and second plots, means for geolocating said first and second designated plots, and means for interring cremated remains so that the first and second parcel owners can practice the method of interring the cremated remains of deceased subjects within a parcel of land.

18. The method of claim 12, wherein consumers are able to view and purchase plots available for interment.

* * * * *